US006984065B2

(12) United States Patent
Roepke

(10) Patent No.: US 6,984,065 B2
(45) Date of Patent: Jan. 10, 2006

(54) MEASURING ARRANGEMENT, ENERGY STORAGE MODULE, AND ELECTRICAL APPARATUS

(75) Inventor: Stefan Roepke, Leinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/401,160

(22) Filed: Mar. 27, 2003

(65) Prior Publication Data

US 2003/0223474 A1 Dec. 4, 2003

(30) Foreign Application Priority Data

Mar. 30, 2002 (DE) .............................. 102 14 368

(51) Int. Cl.
G01K 1/14 (2006.01)
H02J 1/00 (2006.01)
(52) U.S. Cl. ...................... 374/100; 374/208; 320/150
(58) Field of Classification Search .................. 429/90, 429/93; 374/100, 57, 4, 45, 159, 208; 324/426, 324/104; 361/103–106; 320/150
See application file for complete search history.

(56) References Cited

U.S. PATENT DOCUMENTS

| | | | | |
|---|---|---|---|---|
| 4,324,285 A | * | 4/1982 | Henderson | 165/11.1 |
| 4,987,579 A | * | 1/1991 | Yoshinaka et al. | 377/25 |
| 5,059,895 A | * | 10/1991 | Cataldi et al. | 324/104 |
| 5,070,427 A | * | 12/1991 | Bush | 361/104 |
| 5,176,451 A | * | 1/1993 | Sasada et al. | 374/179 |
| 5,188,909 A | * | 2/1993 | Pedicini | 429/7 |
| 5,250,892 A | * | 10/1993 | Yang | 320/107 |
| 5,454,641 A | * | 10/1995 | Parker et al. | 374/120 |
| 5,460,902 A | * | 10/1995 | Parker et al. | 429/90 |
| 5,480,734 A | * | 1/1996 | Schulz et al. | 429/7 |
| 5,557,208 A | * | 9/1996 | Parker | 324/435 |
| 5,592,065 A | * | 1/1997 | Oglesbee et al. | 320/113 |
| 5,700,089 A | * | 12/1997 | McKinnon | 374/142 |
| 5,717,257 A | * | 2/1998 | Hofsass | 307/117 |
| 5,811,959 A | * | 9/1998 | Kejha | 320/126 |
| 5,818,204 A | * | 10/1998 | Banyas et al. | 320/150 |
| 5,825,174 A | * | 10/1998 | Parker | 324/106 |
| 5,909,103 A | * | 6/1999 | Williams | 320/134 |
| 5,925,480 A | * | 7/1999 | Shacklett et al. | 429/93 |
| 5,955,868 A | * | 9/1999 | Kaite et al. | 320/119 |
| 6,010,771 A | * | 1/2000 | Isen et al. | 428/209 |
| 6,054,234 A | * | 4/2000 | Weiss et al. | 429/93 |
| 6,152,597 A | * | 11/2000 | Potega | 374/185 |
| 6,160,383 A | * | 12/2000 | Carkner | 320/150 |
| 6,220,750 B1 | * | 4/2001 | Palti | 374/164 |
| 6,307,605 B1 | * | 10/2001 | Bailey | 349/84 |

(Continued)

FOREIGN PATENT DOCUMENTS

DE 26 43 903 3/1978

(Continued)

OTHER PUBLICATIONS

Patent Abstract of Japan JP 8329913, Dec. 13, 1996.

(Continued)

Primary Examiner—Gail Verbitsky
(74) Attorney, Agent, or Firm—Michael J. Striker

(57) ABSTRACT

A measuring arrangement, particularly for measuring the temperature of an accumulator cell, includes an object of measurement (10), a support element (14), and a temperature sensor (12) electrically connected with the support element (14). The temperature sensor (12) is mounted on the support element (14) and is thermally connected with the object of measurement (10). The invention relates further to an energy storage module with this type of measuring arrangement, as well as to an electrical apparatus with this type of energy storage module.

14 Claims, 2 Drawing Sheets

U.S. PATENT DOCUMENTS

| | | | |
|---|---|---|---|
| 6,307,664 B1 * | 10/2001 | Brass et al. | 359/288 |
| 6,309,099 B1 * | 10/2001 | Chang | 374/183 |
| 6,335,113 B1 * | 1/2002 | Nakatani et al. | 429/90 |
| 6,440,602 B1 * | 8/2002 | Morita | 429/120 |
| 6,605,922 B2 * | 8/2003 | Tamai et al. | 320/106 |
| 6,610,438 B2 * | 8/2003 | Okumura et al. | 429/61 |
| 6,610,439 B1 * | 8/2003 | Kimoto et al. | 429/90 |
| 6,676,290 B1 * | 1/2004 | Lu | 374/163 |
| 6,698,233 B2 * | 3/2004 | Pfister et al. | 62/497 |
| 6,795,782 B2 * | 9/2004 | Bertness et al. | 702/63 |
| 6,811,921 B2 * | 11/2004 | Dansui et al. | 429/99 |
| 6,893,753 B2 * | 5/2005 | Iwaizono et al. | 429/7 |
| 2003/0049522 A1 * | 3/2003 | Doomernik | 429/93 |
| 2003/0157399 A1 * | 8/2003 | Ikeuchi et al. | 429/62 |
| 2003/0185278 A1 * | 10/2003 | Roepke et al. | 374/152 |
| 2003/0198135 A1 * | 10/2003 | Beatty et al. | 368/10 |
| 2004/0070371 A1 * | 4/2004 | Chern et al. | 320/136 |
| 2004/0201364 A1 * | 10/2004 | Small | 320/112 |
| 2005/0068005 A1 * | 3/2005 | Yamashita | 320/116 |
| 2005/0073314 A1 * | 4/2005 | Bertness et al. | 324/433 |

FOREIGN PATENT DOCUMENTS

| | | | |
|---|---|---|---|
| DE | 3742088 A1 * | 6/1989 |
| DE | 41 23 361 A1 | 1/1993 |
| DE | 44 00 461 C1 | 1/1995 |
| EP | 0795206 B1 * | 4/1999 |
| EP | 0 987 656 A2 | 3/2000 |
| GB | 2 145 229 A | 3/1986 |
| JP | 11054110 A * | 2/1999 |
| JP | 11339766 A * | 12/1999 |
| JP | 2001267505 A * | 9/2001 |
| JP | 2002124305 A * | 4/2002 |
| JP | 2003257413 A * | 9/2003 |
| WO | 87/00917 | 2/1987 |
| WO | 01/99211 A1 | 12/2001 |

OTHER PUBLICATIONS

Patent Abstract of Japan JP 2000101446, Mar. 22, 2000.

* cited by examiner

MEASURING ARRANGEMENT, ENERGY STORAGE MODULE, AND ELECTRICAL APPARATUS

BACKGROUND OF THE INVENTION

The present application is related to at least one other application filed with the U.S. Patent and Trademark Office having the same inventor (serial number not yet assigned), which contain subject matter that is different from, but related to, the subject matter of the instant application.

The present invention relates to a measuring arrangement, in particular, for measuring the temperature of an accumulator cell, as well as an energy storage module with the inventive measuring arrangement and an electrical apparatus with this type of energy storage module.

It is known to use a temperature sensor, for example, a so-called NTC resistance (Negative Temperature Coefficient) to measure the temperature of an accumulator cell, representing an object of measurement. The temperature sensor is secured to an accumulator cell by means of a heat-conductive adhesive band made, for example, from aluminum, whereby the accumulator cell is previously freed from its paper insulation, in order to achieve the best possible heat transfer from the accumulator cell to the temperature sensor. In this manner, the temperature sensor is connected via a cable with an electrical evaluation switch, which typically is arranged on a circuit board as a support element.

SUMMARY OF THE INVENTION

The invention includes the general technical teachings of mounting the temperature sensor directly on the support element, so that, advantageously, a cable connection between the temperature sensor and the support element can be eliminated.

In this manner, the temperature sensor is thermally connected with the object of measurement, in order to affect a good heat transfer from the object of measurement onto the temperature sensor. Under the term "temperature sensor", it should be understood that all components are included, by means of which a temperature can be completed.

On one variation of the invention, the thermal binding of the temperature to the object of measurement takes place in that the temperature sensor directly contacts the object of measurement.

According to another variation of the invention, in contrast, a separate heat-conducting element is provided for thermal binding of the temperature sensor to the object of measurement, which on one side, contacts the temperature sensor and on the other side, contacts the object of measurement. This offers the advantages that also a distance between the temperature sensor and the object of measurements can be bridged over.

Preferably, the heat-conducting element is flexible or elastic. This offers, for one, the advantage that the heat-conducting element can be adjusted to manufacturing-related tolerances of the distance between the temperature sensor and the object of measurement. For another, the flexibility of the heat-conducting element makes possible a surface contact with the temperature sensor or with the object of measurement, whereby the heat transfer resistance is reduced and the measuring accuracy is increased.

For example, the heat-conducting element can be made of rubber, plastic, adhesive, aerated or foam material, or a combination of these materials. However, also other material combinations of the heat-conducting element are possible.

According to one variation of the invention, the heat-conducting element is made of an electrically insulating material. For one, this offers the advantage that undesired surface leakage currents are prevented via the heat-conducting element. For another, in this manner, it is ensured that the heat-conducting element does not cause a short circuit upon loosening of its attachment.

One variation of the invention contemplates that the heat-conducting element is connected by means of an adhesive connection with the temperature sensor and/or the object of measurement, whereby preferably, a heat-conductive adhesive is used. This manner of attachment offers the advantage of an intimate heat contact between the heat-conducting element and the temperature sensor or the object of measurement. In addition, an adhesive connection, in addition to the thermal binding, makes possible simultaneously a mechanical attachment of the heat-conducting element, so that a separate attachment element for the heat-conducting element can be eliminated.

The possibility also exists that the shape of the heat-conducting element is adapted on its side facing the temperature sensor to the shape of the temperature sensor. In the same manner, also the shape of the heat-conducting element can be adapted on its side facing the object of measurement to the shape of the object of measurement. This type of shape adaptation takes place preferably, such that the effective contact surface between the heat-conducting element and the temperature sensor or object of measurement is increased, which contributes to a good heat transfer and, therewith, increases the measurement accuracy.

The heat transfer can be improved even more when the heat-conducting element has a mounting for the temperature sensor, whereby the mounting preferably has an interior shape, which is adapted to the outer shape of the temperature sensor. Preferably, the mounting accommodates the temperature sensor sufficiently in order to achieve the least possible heat transfer resistance between the heat-conducting element and the temperature sensor.

In one variation of the invention, for improvement of the heat transfer, it is additionally provided that the temperature sensor, the heat-conducting element and/or the object of measurement is coated with heat-conducting paste on the contact surfaces.

Preferably, the temperature sensor is thermally insulated relative to the support element, for example, the circuit board of an electronic switch, so that the temperature measurement is not adulterated by the heating of the support element that often occurs in operation. The thermal insulation can take place by means of an air gap between the temperature sensor and the support element, for example. It is also possible, however, to arrange a separate insulating element between the temperature sensor and the support element, which is made of a thermally insulating material. For example, the insulating element can be made of a foam or aerated plastic material, paper, cardboard, plastic, or rubber; however, also other materials are possible, which have a minimal thermal conductivity.

In addition, it is advantageous if the insulating element is plate-shaped or flat and is simply placed between the temperature sensor and the support element. Preferably, the insulation element has a bushing for conducting legs of the temperature sensor, so that the insulating element is fixed also mechanically by means of the conducting legs of the temperature sensor.

The term "heat-conducting element" used here is to be understood to include all components, which have good heat conductivity. Preferably, the heat-conducting element, however, is made from a material, whose heat conductivity is greater than the heat conductivity of air, plastic, the material of the support element, the material of the temperature sensor and/or the material of the cell itself.

Furthermore, the invention relates also to an energy storage module, such as, for example, an accumulator pack, with a measuring arrangement according to the present invention.

Finally, the invention also includes an electrical apparatus with the energy storage module of the present invention. For example, the inventive measuring arrangement can be used in hand drills, locating apparatus, electrical grinding apparatus, electrically driven hand saws, accumulator screws or worms, and similar apparatus, in order to measure the temperature of the accumulator cells.

BRIEF DESCRIPTION OF THE DRAWINGS

Further advantages are provided in the following description of the drawing. In the drawing, one embodiment of the invention is illustrated. The drawing, the description, and the claims contain a multitude of features in combination. The practitioner also is to recognize individual features and to combine them in further, practical combinations.

FIG. 2a shows an alternative embodiment of a measuring arrangement of the present invention;

FIG. 2b shows the heat-conducting element of the measuring arrangement illustrated in FIG. 2a.

DETAILED DESCRIPTION OF THE PREFERRED EMBODIMENTS

Figure 1:
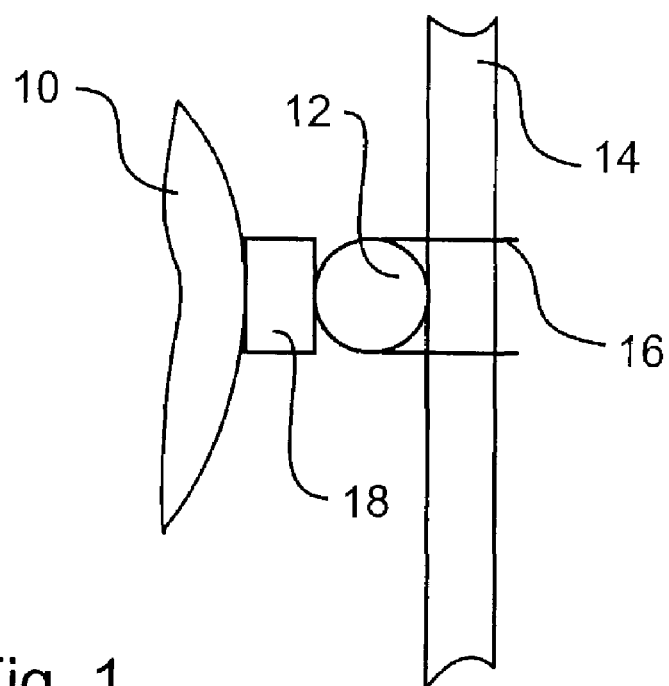
FIG. 1 shows a schematic illustration of a measuring arrangement of the present invention for detecting the temperature of an accumulator cell.

The embodiment according to FIG. 1 shows a measuring arrangement for measuring the temperature of a cell 10 of an accumulator pack for a hand drill or a similar electrical apparatus.

In this connection, the measuring arrangement has a temperature sensor 12 in the form of a NTC resistance (Negative Temperature Coefficient), whose electrical resistance is temperature-dependent and therefore, makes possible the determination of the temperature by means of a resistance measurement.

The actual measurement takes place by means of a common measuring switch, which is not illustrated for reasons of simplicity, which is arranged on a circuit board 14.

For electrical connection of the temperature sensor 12 with the measuring switch, the temperature sensor 12 has two conducting legs, which are inserted through corresponding solder eyes in the circuit board 14, whereby the conducting legs 16 are soldered with the conducting tracks on the side of the circuit board 14 facing away from the temperature sensor 12.

The thermal connection of the temperature 12 with the cell 10 takes place hereby by means of a square heat-conducting element 18 made from a good heat-conductive rubber. The heat-conducting element 18 contacts flatly on one side the upper surface of the cell 10 and on the other side, flatly contacts the upper surface of the temperature sensor 12, so that the heat-conducting element 18 draws off the heat produced by the cell 10 to the temperature sensor 12. Based on the good heat transfer from the cell 10 via the heat-conducting element 18 onto the temperature sensor 12, the temperatures of the cell 10 and the temperature sensor 12 agree almost completely, so that the measuring error is very small.

In addition, the heat-conducting element 18 is flexible and elastic, so that the outer contour of the heat-conducting element 18 can be well adapted to the outer contour of the cell 10 and the temperature sensor 12. This shape adaptation leads to an increase of the contact surfaces and therewith, to a reduction of the heat transfer resistance between the heat-conducting element 18 and the cell 10 or the temperature sensor 12.

In addition to this improvement of the heat transfer, the flexibility of the heat conducting element 18 also advantageously makes possible an equalizing of the manufacturing tolerances, which are expressed in a differing distance between the cell 10 and the temperature sensor 12.

Figures 2A, 2B:
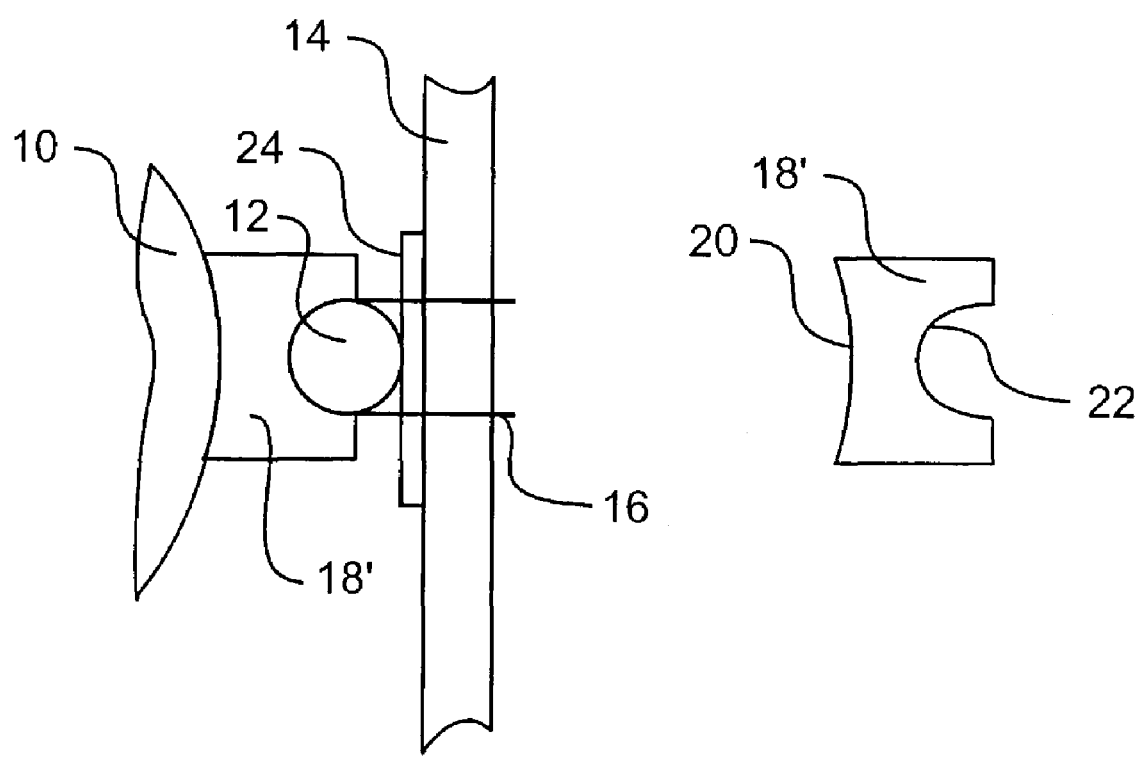

FIGS. 2a and 2b show a further embodiment of the inventive measuring arrangement, which substantially agrees with the previously described embodiment shown in FIG. 1, so that the same reference numerals are used for like components and to avoid repetition, reference is made to the previous description of FIG. 1.

A characteristic of this embodiment is the constructive formation of a heat-conducting element 18', which, like the heat-conducting element 18 in FIG. 1, thermally connects the temperature sensor 12 with the cell 10.

Thus, the upper surface 20 of the heat-conducting element 18' facing the cell 10 is already concavely bended in the premounted state shown in FIG. 2b, whereby the curve radius of the upper surface 20 of the heat-conducting element 18' on the side facing toward the cell 10 is the same as the curve radius of the upper surface of the cell 10. This offers the advantage that the contact surface between the cell 10 and the heat-conducting element 18' is increased, which leads to a smaller heat transfer resistance and therewith, to a greater accuracy of measurement.

A further characteristic of this embodiment lies in the fact that the heat-conducting element 18' has a mounting 22 for the temperature sensor 12 on the side facing toward the temperature sensor 12. The mounting 22 essentially comprises a hemispherical depression in the heat-conducting element 18', whereby the inner contour of the mounting 22 is adapted to the outer contour of the temperature sensor 12, so that the temperature sensor 12 and the heat-conducting element 18 are in thermal contact.

Finally, this embodiment also has the characteristic that between the temperature sensor 12 and the circuit board 14, a heat-insulating disk is arranged, which substantially prevents adulteration of the temperature measurement from the heat being emitted from the circuit board 14. The mechanical fixing of the disk 24 takes place by means of the conducting legs 16 of the temperature sensor 12, in which the conducting legs 16 project through corresponding bores in the disk 24.

Figure 3:
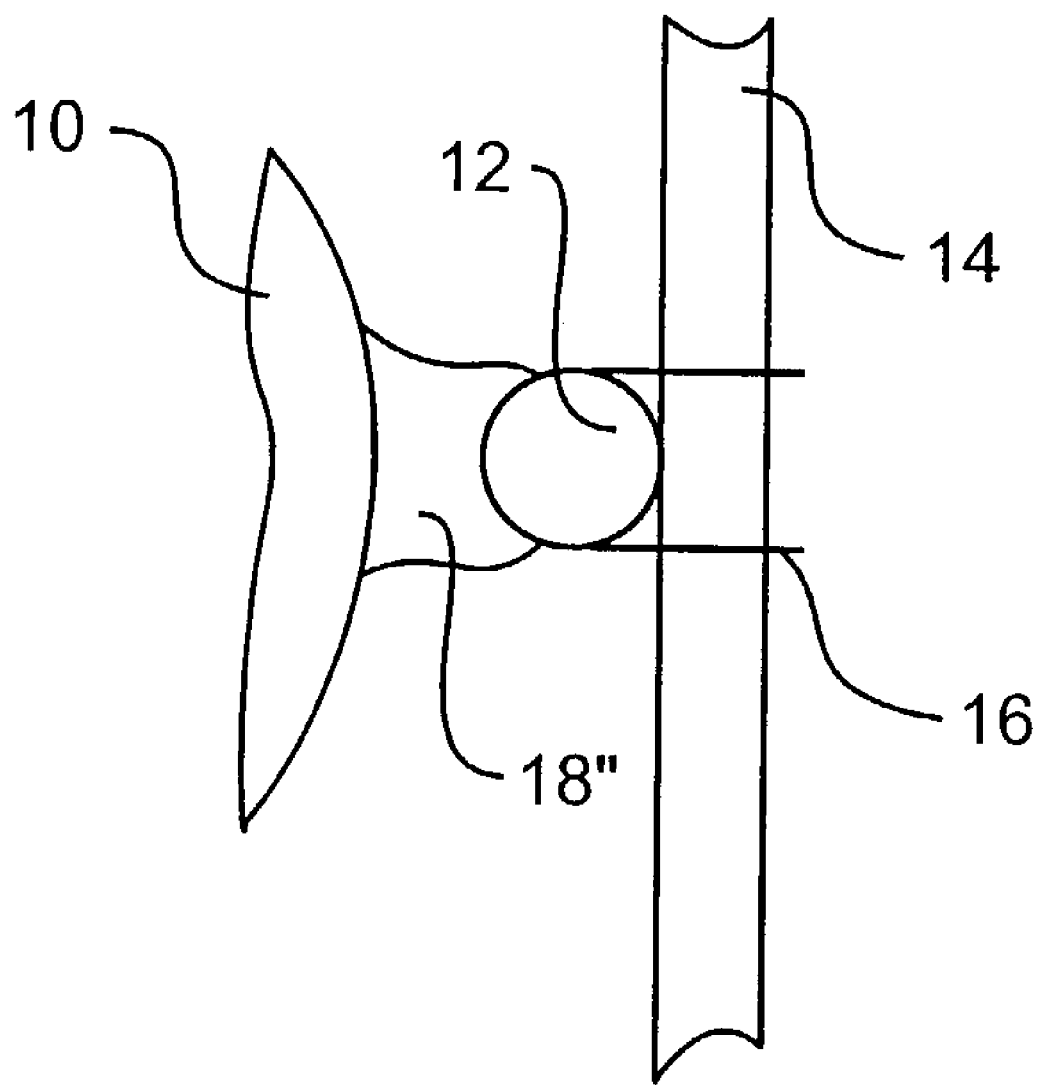
FIG. 3 shows a further embodiment of a measuring arrangement of the present invention.

FIG. 3 shows finally a further embodiment of the inventive measuring arrangement, which substantially conforms with the previously described embodiment of FIG. 1, so that, subsequently, the same reference numerals are used for like elements and to avoid repetition, substantial reference is made to the description relating to FIG. 1.

The characteristic of this embodiment essentially lies in a different type of heat-conducting element 18", which comprises a heat-conducting adhesive.

This offers the advantage that the upper surface of the heat-conducting element 18" also adapts small unevenness in the upper surface of the cell or the temperature sensor 12, whereby the effective contact surface is increased and the heat transfer is improved.

In addition, the thermal connection by means of an adhesive also makes possible an adaptation to different distances between the temperature sensor 12 and the cell 10.

It will be understood that each of the elements described above, or two or more together, may also find a useful application in other types of constructions differing from the types described above.

While the invention has been illustrated and described herein as a measuring arrangement, an energy storage module and an electrical apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims:

What is claimed is:

1. Measuring arrangement for measuring a temperature of an accumulator cell (10), in combination with an accumulator cell (10), a support element (14) configured as a circuit board and supporting an electrical circuit as a whole in a direct contact therewith, an electrical switch mounted on the support element (14), and a temperature sensor (12) thermally connected with the accumulator cell (10) and measuring the temperature of the accumulator cell (10), the temperature sensor (12) is mounted on the support element (14), and wherein an insulating element (24) for thermal insulation of the temperature sensor (12) from the support board (14) is disposed between the temperature sensor (12) and the support element (14).

2. Measuring arrangement according to claim 1, wherein the temperature sensor (12) contacts the accumulator cell (10).

3. Measuring arrangement according to claim 1, wherein the temperature sensor (12) is thermally connected with the accumulator cell (10) via a heat-conducting element (18, 18', 18").

4. Measuring arrangement according to claim 3, wherein the heat-conducting element (18, 18', 18") is elastic and/or flexible.

5. Measuring arrangement according to claim 3, wherein the heat-conducting element (18, 18', 18") is made of rubber, plastic, adhesive, or aerated plastic.

6. Measuring arrangement according to claim 3, wherein the heat-conducting element (18', 18', 18") is made of an electrically insulating material.

7. Measuring arrangement according to claim 3, wherein the heat-conducting element (18, 18', 18") is connected by means of an adhesive connection with the accumulator cell (10) and/or with the temperature sensor (12).

8. Measuring arrangement according to claim 3, wherein the shape of the heat-conducting element (18, 18', 18") on a side of the heat-conducting element facing toward the temperature sensor (12) is adapted to the shape of the temperature sensor and/or that the shape of the heat-conducting element (18, 18', 18") on a side of the heat-conducting element facing toward the accumulator cell (10) is adapted to the shape of the object of measurement (10).

9. Measuring arrangement according to claim 3, wherein the heat-conducting element (18, 18', 18") has a mounting (22) for the temperature sensor (12) on a side of the heat-conducting element (18, 18', 18") facing toward the temperature sensor (12).

10. Energy storage module with at least one cell for storage of electrical energy and a measuring arrangement as defined in claim 1 for measuring the temperature of the cell.

11. Electrical apparatus with an energy storage module as defined in claim 10.

12. Measuring arrangement according to claim 1, wherein said insulating element (24) is made of a thermally insulating material.

13. Measuring arrangement according to claim 1, wherein said insulating element is formed as a heat-insulating disc (24).

14. Measuring arrangement according to claim 1, wherein said insulating element (24) has at least one bore configured to receive a conducting leg (16) of the temperature sensor (12).

* * * * *